US012595170B2

(12) United States Patent
Tanaka et al.

(10) Patent No.: US 12,595,170 B2
(45) Date of Patent: Apr. 7, 2026

(54) HYDROGEN PRODUCTION SYSTEM

(71) Applicant: MITSUBISHI HEAVY INDUSTRIES, LTD., Tokyo (JP)

(72) Inventors: Atsushi Tanaka, Tokyo (JP); Yoshio Seiki, Tokyo (JP); Shuntaro Seto, Tokyo (JP); Hideki Ito, Tokyo (JP); Hidekazu Nishino, Tokyo (JP); Ichirou Toyoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 601 days.

(21) Appl. No.: 18/164,897

(22) Filed: Feb. 6, 2023

(65) Prior Publication Data

US 2023/0303390 A1 Sep. 28, 2023

(30) Foreign Application Priority Data

Mar. 28, 2022 (JP) ................................ 2022-051877

(51) Int. Cl.

| | |
|---|---|
| *C01B 3/0073* | (2026.01) |
| *B01J 7/02* | (2006.01) |
| *B01J 20/02* | (2006.01) |
| *C01B 3/042* | (2026.01) |
| *C01B 3/065* | (2026.01) |

(52) U.S. Cl.
CPC .............. *C01B 3/0073* (2013.01); *B01J 7/02* (2013.01); *B01J 20/0248* (2013.01); *C01B 3/042* (2013.01); *C01B 3/065* (2013.01)

(58) Field of Classification Search
CPC ........... B01J 7/02; C01B 3/0073; C01B 3/065
See application file for complete search history.

(56) References Cited

U.S. PATENT DOCUMENTS 4,769,225 A * 9/1988 Reilly ................... C01B 3/0057
423/644

FOREIGN PATENT DOCUMENTS

| | | | | |
|---|---|---|---|---|
| EP | 0094136 A1 * | 11/1983 | ........... | C01B 3/0068 |
| EP | 4119494 A1 | 1/2023 | | |
| JP | 2019-218251 A | 12/2019 | | |
| JP | 2021-167262 A | 10/2021 | | |

* cited by examiner

*Primary Examiner* — Lessanework Seifu
(74) *Attorney, Agent, or Firm* — Osha Bergman Watanabe & Burton LLP

(57) ABSTRACT

A hydrogen production system includes: a hydrogen compound slurry in which a hydrogen compound member is suspended in a solvent containing water; a first vessel; a second vessel having an internal temperature higher than that of the first vessel; a first passage connecting the first vessel and the second vessel; and a second passage connecting the first vessel and the second vessel and different from the first passage. The hydrogen production system is configured to allow the hydrogen compound slurry contained in the first vessel to move into the second vessel through the first passage, and the hydrogen compound slurry contained in the second vessel to move into the first vessel through the second passage.

7 Claims, 2 Drawing Sheets

HYDROGEN PRODUCTION SYSTEM

TECHNICAL FIELD

The present disclosure relates to a hydrogen production system.

The present application claims priority based on Japanese Patent Application No. 2022-51877 filed on Mar. 28, 2022, the entire content of which is incorporated herein by reference.

BACKGROUND ART

Patent Document 1 discloses a two-dimensional borohydride sheet that releases hydrogen when heated to 150 to 200° C. Since hydrogen is highly reactive and explosive, as a method to easily produce hydrogen even at room temperature, Patent Document 1 describes irradiating the two-dimensional borohydride sheet with light to produce hydrogen.

CITATION LIST

Patent Literature
Patent Document 1: JP2019-218251A

SUMMARY

In either heating or light irradiation, in order to properly collect hydrogen released from the two-dimensional borohydride sheet, the hydrogen should be released from the two-dimensional borohydride sheet contained in a sealed vessel, and the released hydrogen has to be discharged from the vessel. This means that when hydrogen is released by heating, not only the two-dimensional borohydride sheet but also the vessel is heated together, requiring extra heat equivalent to the heat capacity of the vessel during heating, which lowers the thermal efficiency and the manufacturing cost of hydrogen.

In view of the above, an object of at least one embodiment of the present disclosure is to provide a hydrogen production system that can improve the manufacturing cost of hydrogen.

To achieve the above object, a hydrogen production system according to the present disclosure includes: a hydrogen compound slurry in which a hydrogen compound member is suspended in a solvent containing water; a first vessel; a second vessel having an internal temperature higher than that of the first vessel; a first passage connecting the first vessel and the second vessel; and a second passage connecting the first vessel and the second vessel and different from the first passage. The hydrogen production system is configured to allow the hydrogen compound slurry contained in the first vessel to move into the second vessel through the first passage, and the hydrogen compound slurry contained in the second vessel to move into the first vessel through the second passage.

With the hydrogen production system of the present disclosure, hydrogen can be produced by moving the hydrogen compound slurry containing the hydrogen compound member that stores hydrogen in the first vessel into the second vessel, which has a higher temperature than the first vessel, releasing hydrogen from the hydrogen compound member in the second vessel, and moving the hydrogen compound slurry containing the hydrogen compound member that has released hydrogen back into the first vessel, where the hydrogen compound member stores hydrogen again. With such operations, it is only necessary to raise or lower the temperature of the hydrogen compound slurry, and temperature changes in the first vessel and the second vessel containing the hydrogen compound slurry can be suppressed as much as possible. Thus, the thermal efficiency can be improved, so that the manufacturing cost of hydrogen can be improved.

DETAILED DESCRIPTION

Hereinafter, a hydrogen production system according to embodiments of the present disclosure will be described with reference to the drawings. The embodiment to be described below indicates one aspect of the present disclosure, does not intend to limit the disclosure, and can optionally be modified within a range of a technical idea of the present disclosure.

First Embodiment

<Configuration of Hydrogen Production System According to First Embodiment of Present Disclosure>

Figure 1:
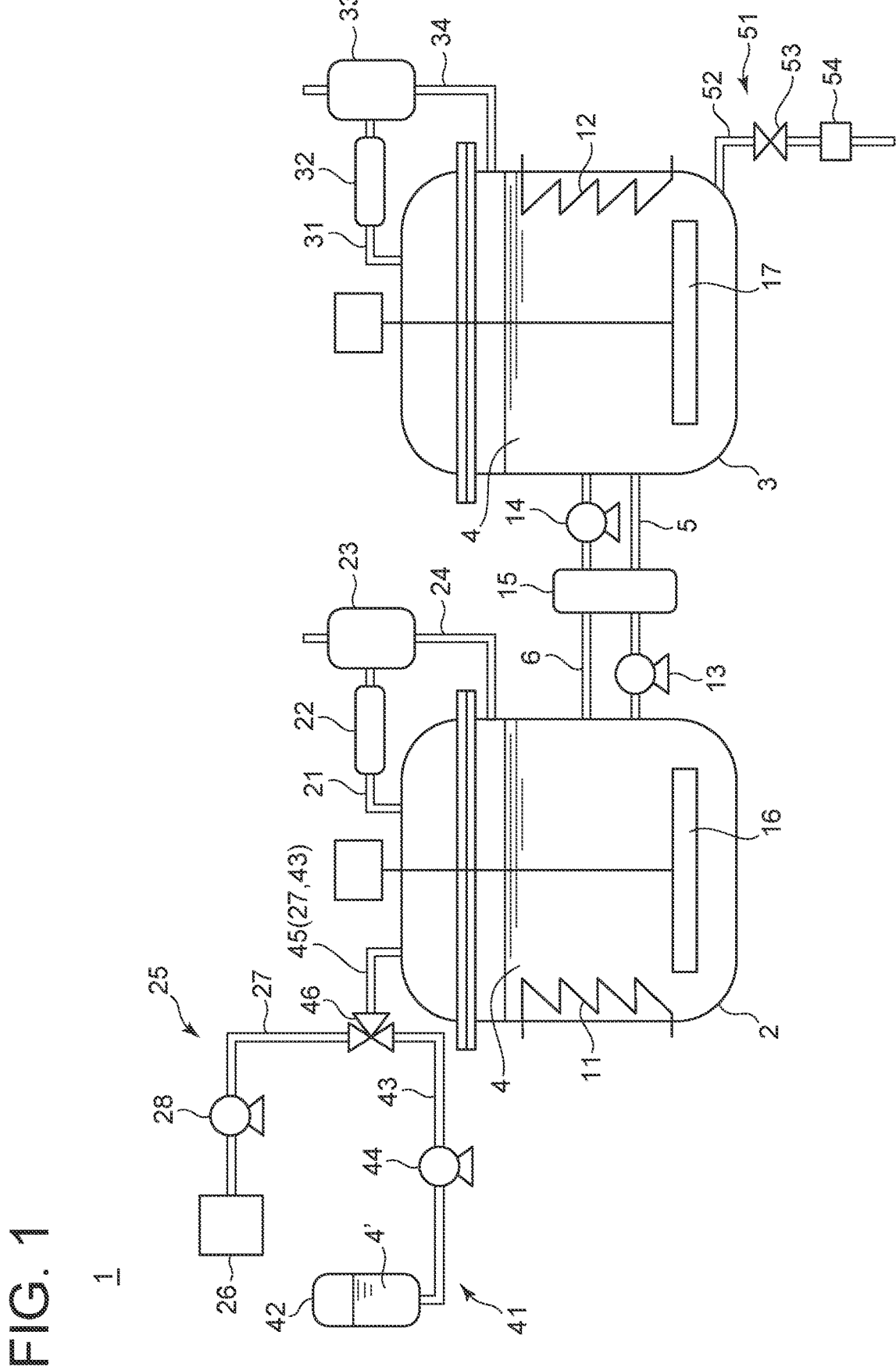
FIG. 1 is a schematic configuration diagram of a hydrogen production system according to the first embodiment of the present disclosure.

As shown in FIG. 1, a hydrogen production system 1 according to the first embodiment of the present disclosure includes a first vessel 2 and a second vessel 3. Each of the first vessel 2 and the second vessel 3 is configured to be able to contain hydrogen compound slurry 4 in which a hydrogen compound member is suspended in a solvent containing water. The first vessel 2 and the second vessel 3 are connected through two different passages, namely a first passage 5 and a second passage 6. Here, the solvent containing water is not limited to a solvent containing only water, and may be a solvent in which water is mixed with an organic solvent such as acetonitrile or acetone.

The hydrogen compound member has a configuration in which a powder material having a two-dimensional array of a hydrogen compound represented by chemical formula $X_mH_n$ where X is an element other than hydrogen (H), is supported on a particulate carrier, for example, beads. The stoichiometric ratio m:n is 1:1 to 3:4 (for example, XH, $XH_2$, $XH_3$, $XH_4$, $X_2H_3$, $X_3H_4$). The element X may be, but is not limited to, boron (B), for example.

In the hydrogen production system 1, the temperature in the second vessel 3, that is, the temperature of the hydrogen compound slurry 4 contained in the second vessel 3, is maintained higher than the temperature in the first vessel 2, that is, the temperature of the hydrogen compound slurry 4 contained in the first vessel 2. In order to maintain such a temperature relationship, a first temperature adjustment device 11 may be provided in the first vessel 2, and a second temperature adjustment device 12 may be provided in the second vessel 3. The configurations of the first temperature adjustment device 11 and the second temperature adjustment device 12 are not particularly limited, and may be, for example, coiled piping through which a heat medium for heat exchange with the hydrogen compound slurry 4 can flow. Specifically, the temperature range of the former is preferably 20° C. to 150° C., and the temperature range of the latter is preferably 150° C. to 250° C. In order to maintain water in the liquid state in such temperature ranges, the internal pressure of each of the first vessel 2 and the second vessel 3 is pressurized to at least atmospheric pressure or higher (e.g., 4 MPaG).

As described in detail in the description of the operation below, the hydrogen compound slurry 4 in the first vessel 2 is transferred to the second vessel 3 through the first passage 5, and the hydrogen compound slurry 4 in the second vessel 3 is transferred to the first vessel 2 through the second passage 6. To achieve this operation, as an example, a first pump 13 and a second pump 14 may be provided on the first passage 5 and the second passage 6, respectively. The first pump 13 and the second pump 14 can force the hydrogen compound slurry 4 to circulate between the first vessel 2 and the second vessel 3.

A heat exchanger 15 may be provided to exchange heat between the hydrogen compound slurry 4 flowing through the first passage 5 and the hydrogen compound slurry 4 flowing through the second passage 6 while the hydrogen compound slurry 4 circulates between the first vessel 2 and the second vessel 3.

The first vessel 2 and the second vessel 3 may be provided with stirring devices 16 and 17, respectively, for stirring the hydrogen compound slurry 4 contained therein. If there is no stagnation in the flow of the hydrogen compound slurry 4 when the hydrogen compound slurry 4 circulates between the first vessel 2 and the second vessel 3, the hydrogen compound member would not precipitate from the hydrogen compound slurry 4, but in practice, it is difficult to completely prevent the precipitation of the hydrogen compound member. In contrast, if the hydrogen compound slurry 4 in the first vessel 2 and the second vessel 3 are sufficiently stirred by the stirring devices 16 and 17 provided in the first vessel 2 and the second vessel 3, respectively, the precipitation of the hydrogen compound member from the hydrogen compound slurry 4 can be suppressed. Stirring the hydrogen compound slurry 4 can also improve the temperature adjustment efficiency of the hydrogen compound slurry 4 by the first temperature adjustment device 11 and the second temperature adjustment device 12.

As described in detail in the description of the operation below, oxygen is produced when hydrogen is held by the hydrogen compound member in the first vessel 2. To discharge the produced oxygen from the first vessel 2, the first vessel 2 may be connected to one end of an outflow passage 21. The outflow passage 21 may be provided with a separation device 22 for separating fluid flowing through the outflow passage 21 into water and oxygen. The separation device 22 may be a cooler or a separation membrane device. If the separation device 22 is a cooler, a reflux tank 23 may be provided downstream of the separation device 22 in the outflow passage 21. To return the water separated by the separation device 22 to the first vessel 2, a water return passage 24 may be provided with one end connected to the separation device 22 or the reflux tank 23 and the other end connected to the first vessel 2.

As described in detail in the description of the operation below, hydrogen is released from the hydrogen compound member in the second vessel 3. To discharge the released hydrogen from the second vessel 3, the second vessel 3 may be connected to one end of an outflow passage 31. The outflow passage 31 may be provided with a separation device 32 for separating fluid flowing through the outflow passage 31 into water and hydrogen. The separation device 32 may be a cooler or a separation membrane device. If the separation device 32 is a cooler, a reflux tank 33 may be provided downstream of the separation device 32 in the outflow passage 31. To return the water separated by the separation device 32 to the second vessel 3, a water return passage 34 may be provided with one end connected to the separation device 32 or the reflux tank 33 and the other end connected to the second vessel 3.

As described in detail in the description of the operation below, while hydrogen is produced in the hydrogen production system 1, water of the hydrogen compound slurry 4 is consumed. A water supply device 25 may be provided to allow continuous production of hydrogen by replenishing the consumed water to the hydrogen production system 1. Water may be supplied into either the first vessel 2 or the second vessel 3, but it is preferable to supply water into the first vessel 2, where the internal temperature is lower, from the viewpoint of thermal efficiency. The specific configuration of the water supply device 25 is not particularly limited, but for example, the water supply device 25 may include a water supply passage 27 connected at one end to a water supply source 26 such as a tap or a water storage tank and connected at the other end to the first vessel 2, and a pump 28 disposed on the water supply passage 27.

The hydrogen compound member is not permanently usable and deteriorates in the course of hydrogen production. For this reason, a hydrogen compound supply device 41 for supplying the hydrogen compound member into the first vessel 2, and a discharge device 51 for discharging the hydrogen compound slurry 4 in the second vessel 3 may be provided. Thereby, the deteriorated hydrogen compound member can be removed from the hydrogen production system 1, and a new hydrogen compound member can be supplied to the hydrogen production system 1, allowing continuous production of hydrogen.

The specific configuration of the hydrogen compound supply device 41 is not particularly limited, but it may include, for example, a slurry tank 42, which is a storage for storing hydrogen compound slurry 4' containing a new hydrogen compound member, a slurry supply passage 43 connecting the slurry tank 42 and the first vessel 2, and a supply pump 44 disposed on the slurry supply passage 43. The slurry supply passage 43 may be directly connected to the first vessel 2, or a merging passage 45, where the slurry supply passage 43 and the water supply passage 27 join, may be connected to the first vessel 2. In the latter, a three-way valve 46 may be provided at the confluence between the water supply passage 27 and the slurry supply passage 43 to switch between the supply of water from the water supply source 26 and the supply of hydrogen compound slurry 4' from the slurry tank 42.

The hydrogen compound supply device 41 may be configured to supply the new hydrogen compound member in the form of particle into the first vessel 2 or the water supply passage 27, rather than in the form of slurry. However, if the particulate hydrogen compound member is directly supplied into the first vessel 2, the supplied hydrogen compound member may agglomerate. In contrast, if the new hydrogen compound member is supplied in the form of slurry, it is possible to reduce the possibility that the hydrogen compound member agglomerates.

The specific configuration of the discharge device 51 is not particularly limited, but it may include, for example, a discharge passage 52 connected at one end to the second vessel 3, and a valve 53 disposed on the discharge passage 52. Further, the discharge device may include a solid-liquid separator 54 for separating the hydrogen compound slurry 4 into solid and liquid phases. The specific configuration of the solid-liquid separator 54 is not particularly limited, but the solid-liquid separator 54 may be, for example, a filter.

<Operation of Hydrogen Production System According to First Embodiment of Present Disclosure>

Next, the operation of the hydrogen production system 1 according to the first embodiment of the present disclosure will be described. Each of the first vessel 2 and the second vessel 3 contains the hydrogen compound slurry 4. For example, by the first temperature adjustment device 11 and the second temperature adjustment device 12, the temperature of the hydrogen compound slurry 4 in the first vessel 2 is maintained in the range of 100° C. to 150° C., and the temperature of the hydrogen compound slurry 4 in the second vessel 3 is maintained in the range of 200° C. to 250° C. In the first vessel 2, when the temperature of the hydrogen compound slurry 4 falls within the above range, water is decomposed into hydrogen and oxygen in the presence of the hydrogen compound member, and the hydrogen is absorbed into the hydrogen compound member. As a result, the hydrogen compound member stores hydrogen. The oxygen flows out of the first vessel 2 to the outflow passage 21 and is separated into water and oxygen by the separation device 22. The water is returned to the first vessel 2 through the water return passage 24, and the oxygen is supplied to a storage facility or an oxygen consumption facility (not shown). In the first embodiment, the hydrogen compound member is in the form of slurry suspended in water, so the contact between water and the hydrogen compound member is good. In contrast, in the configuration where water or steam is supplied to the hydrogen compound member, the flow path of the water or steam may be fixed, and a portion of the hydrogen compound member may not be in contact with the water or steam. Thus, the use of the hydrogen compound slurry 4 allows hydrogen to be absorbed into the hydrogen compound member more efficiently than in the configuration where water or steam is supplied to the hydrogen compound member.

When the hydrogen compound slurry 4 containing the hydrogen compound member that stores hydrogen flows into the second vessel 3 through the first passage 5 by the first pump 13, for example, the temperature rises to the range of 200° C. to 250° C. When the hydrogen compound member that stores hydrogen falls within this temperature range, hydrogen is released from the hydrogen compound member. The hydrogen flows out of the second vessel 3 to the outflow passage 31 and is separated into water and hydrogen by the separation device 32. The water is returned to the second vessel 3 through the water return passage 34, and the hydrogen is supplied to a storage facility or a hydrogen consumption facility (not shown).

When the hydrogen compound slurry 4 containing the hydrogen compound member that has released hydrogen flows into the first vessel 2 through the second passage 6 by the second pump 14, for example, the temperature shifts to the range of 100° C. to 150° C. When the hydrogen compound member that has released hydrogen falls within this temperature range, through the above-described operation, hydrogen is absorbed into the hydrogen compound member. As the hydrogen compound slurry 4 circulates between the first vessel 2 and the second vessel 3 having different temperatures, the hydrogen compound member stores hydrogen in the first vessel 2, and the hydrogen compound member releases hydrogen in the second vessel 3, whereby the hydrogen production system 1 produces hydrogen.

With the hydrogen production system 1, hydrogen can be produced by moving the hydrogen compound slurry 4 containing the hydrogen compound member that stores hydrogen in the first vessel 2 into the second vessel 3, which has a higher temperature than the first vessel 2, releasing hydrogen from the hydrogen compound member in the second vessel 3, and moving the hydrogen compound slurry 4 containing the hydrogen compound member that has released hydrogen back into the first vessel 2, where the hydrogen compound member stores hydrogen again. With such operations, it is only necessary to raise or lower the temperature of the hydrogen compound slurry 4, and temperature changes in the first vessel 2 and the second vessel 3 containing the hydrogen compound slurry 4 can be suppressed as much as possible. Thus, the thermal efficiency can be improved, so that the manufacturing cost of hydrogen can be improved.

When the hydrogen production system 1 is equipped with the heat exchanger 15, the hydrogen compound slurry 4 transferred from the first vessel 2 to the second vessel 3 is heated while the hydrogen compound slurry 4 transferred from the second vessel 3 to the first vessel 2 is cooled, so the load on the first temperature adjustment device 11 and the second temperature adjustment device 12 can be reduced. As a result, the thermal efficiency can be improved, and the manufacturing cost of hydrogen can be improved.

When the hydrogen production system 1 is equipped with the water supply device 25, water can be supplied from the water supply device 25 into the first vessel 2 at a flow rate that compensates for water consumed in the first vessel 2 during the hydrogen production operation. This enables continuous production of hydrogen in the hydrogen production system 1.

As previously described, the hydrogen compound member deteriorates in the course of hydrogen production. When the hydrogen production system 1 is equipped with the hydrogen compound supply device 41 and the discharge device 51, the deteriorated hydrogen compound member can be discharged while replenishing a new hydrogen compound member. This enables continuous production of hydrogen.

When the discharge device 51 includes the solid-liquid separator 54, the hydrogen compound slurry discharged from the second vessel 3 can be separated into solid and liquid phases, and the separated solid, i.e., the deteriorated hydrogen compound member, can be recovered. If the hydrogen compound member is recyclable, the recovered hydrogen compound member can be regenerated and then reused in the hydrogen production system 1.

Second Embodiment

Next, a hydrogen production system according to the second embodiment of the present disclosure will be described. The hydrogen production system according to the second embodiment is obtained by modifying the means for circulating the hydrogen compound slurry 4 between the first vessel 2 and the second vessel 3 according to the first embodiment. In the second embodiment, the same constituent element as those in the first embodiment are associated with the same reference numerals and not described again in detail.

<Configuration of Hydrogen Production System According to Second Embodiment of Present Disclosure>

Figure 2:
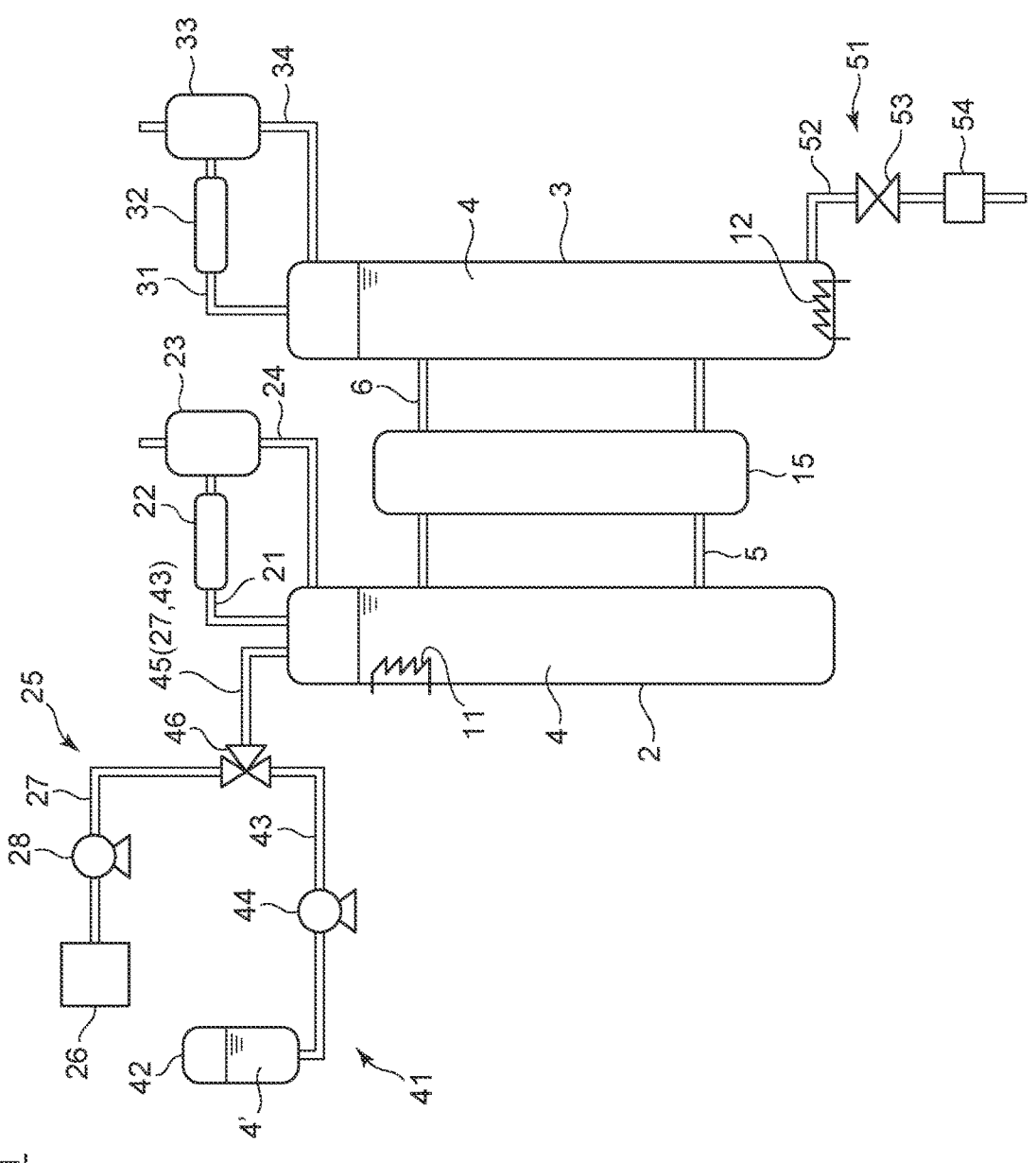
FIG. 2 is a schematic configuration diagram of a hydrogen production system according to the second embodiment of the present disclosure.

As shown in FIG. 2, in the hydrogen production system 1 according to the second embodiment of the present disclosure, the second passage 6 is disposed vertically above the first passage 5. The first temperature adjustment device 11 is disposed in the first vessel 2 so as to be located above the position where the first passage 5 is connected to the first vessel 2. The first temperature adjustment device 11 is preferably disposed at a position as high as possible in the vertical direction in the first vessel 2. Therefore, the first temperature adjustment device 11 is preferably disposed near the liquid level of the hydrogen compound slurry 4 in the first vessel 2. If the hydrogen compound slurry 4 is full in the first vessel 2, the first temperature adjustment device 11 is preferably disposed at the top of the first vessel 2. Since the hydrogen compound slurry 4 in the first vessel 2 is transferred to the second vessel 3 through the first passage 5, the liquid level of the hydrogen compound slurry 4 in the first vessel 2 should be at least above the position where the first passage 5 is connected to the first vessel 2. Therefore, the first temperature adjustment device 11 is disposed in the first vessel 2 at least above the position where the first passage 5 is connected to the first vessel 2.

The second temperature adjustment device 12 is disposed in the second vessel 3 so as to be located below the position where the first passage 5 is connected to the second vessel 3. The second temperature adjustment device 12 is preferably disposed at a position as low as possible in the vertical direction in the second vessel 3. Therefore, the second temperature adjustment device 12 is preferably disposed at the bottom of the second vessel 3. Other configurations are the same as those in the first embodiment, except that the stirring devices 16 and 17 (see FIG. 1), the first pump 13 (see FIG. 1) and the second pump 14 (see FIG. 1) are not provided.

<Operation of Hydrogen Production System According to Second Embodiment of Present Disclosure>

Next, the operation of the hydrogen production system 1 according to the second embodiment of the present disclosure will be described. The second embodiment is different from the first embodiment only in the operation of circulating the hydrogen compound slurry 4 between the first vessel 2 and the second vessel 3, and the other operations are the same as those in the first embodiment. Therefore, only the circulation operation of the hydrogen compound slurry 4 will be described below.

When the hydrogen compound slurry 4 is cooled by the first temperature adjustment device 11 in the first vessel 2, the cooled hydrogen compound slurry 4 moves downward in the first vessel 2 by convection. The hydrogen compound slurry 4 that moves downward in the first vessel 2 then flows through the first passage 5 into the second vessel 3. When the hydrogen compound slurry 4 entering the second vessel 3 is heated by the second temperature adjustment device 12, the heated hydrogen compound slurry 4 moves upward in the second vessel 3 by convection. The hydrogen compound slurry 4 that moves upward in the second vessel 3 then flows through the second passage 6 into the first vessel 2. With such operations, the hydrogen compound slurry 4 can circulate between the first vessel 2 and the second vessel 3 by natural convection. Since the necessity of the pump for circulating the hydrogen compound slurry 4 is eliminated in the second embodiment, the manufacturing cost of hydrogen can be improved compared to the first embodiment.

In order to facilitate circulation of the hydrogen compound slurry 4 between the first vessel 2 and the second vessel 3 by natural convection, each of the first vessel 2 and the second vessel 3 preferably has a shape elongated in the vertical direction.

The contents described in the above embodiments would be understood as follows, for instance.

[1] A hydrogen production system according to one aspect includes: a hydrogen compound slurry (4) in which a hydrogen compound member is suspended in a solvent containing water; a first vessel (2); a second vessel (3) having an internal temperature higher than that of the first vessel (2); a first passage (5) connecting the first vessel (2) and the second vessel (3); and a second passage (6) connecting the first vessel (2) and the second vessel (3) and different from the first passage (5). The hydrogen production system is configured to allow the hydrogen compound slurry (4) contained in the first vessel (2) to move into the second vessel (3) through the first passage (5), and the hydrogen compound slurry (4) contained in the second vessel (3) to move into the first vessel (2) through the second passage (6).

With the hydrogen production system of the present disclosure, hydrogen can be produced by moving the hydrogen compound slurry containing the hydrogen compound member that stores hydrogen in the first vessel into the second vessel, which has a higher temperature than the first vessel, releasing hydrogen from the hydrogen compound member in the second vessel, and moving the hydrogen compound slurry containing the hydrogen compound member that has released hydrogen back into the first vessel, where the hydrogen compound member stores hydrogen again. With such operations, it is only necessary to raise or lower the temperature of the hydrogen compound slurry, and temperature changes in the first vessel and the second vessel containing the hydrogen compound slurry can be suppressed as much as possible. Thus, the thermal efficiency can be improved, so that the manufacturing cost of hydrogen can be improved.

[2] A hydrogen production system according to another aspect is the hydrogen production system of [1], including: a first temperature adjustment device (11) for adjusting a temperature of the hydrogen compound slurry (4) in the first vessel (2); and a second temperature adjustment device (12) for adjusting a temperature of the hydrogen compound slurry (4) in the second vessel (3).

With this configuration, it is possible to maintain the temperature of the hydrogen compound slurry in the first vessel in a temperature range that allows hydrogen to be stored in the hydrogen compound, and the temperature of the hydrogen compound slurry in the second vessel in a temperature range that allows hydrogen to be released from the hydrogen compound.

[3] A hydrogen production system according to still another aspect is the hydrogen production system of [1] or [2], including: a first pump (13), disposed on the first passage (5), for transferring the hydrogen compound slurry (4) in the first vessel (2) to the second vessel (3); and a second pump (14), disposed on the second passage (6), for transferring the hydrogen compound slurry (4) in the second vessel (3) to the first vessel (2).

This configuration can force the hydrogen compound slurry to circulate between the first vessel and the second vessel.

[4] A hydrogen production system according to still another aspect is the hydrogen production system of [2], in which the second passage (6) is disposed vertically above the first passage (5), the first temperature adjustment device (11) is disposed in the first vessel (2) so as to be located above a position where the first passage (5) is connected to the first vessel (2), and the second temperature adjustment device (12) is disposed in the second vessel (3) so as to be located below a position where the first passage (5) is connected to the second vessel (3).

With this configuration, due to convection caused by cooling the hydrogen compound slurry with the first temperature adjustment device in the first vessel, the hydrogen compound slurry moves downward in the first vessel, and then flows through the first passage into the second vessel. The hydrogen compound slurry entering the second vessel is heated by the second temperature adjustment device, and due to convection caused by this heating, the slurry moves upward in the second vessel, and then flows through the second passage into the first vessel. With such operations, the hydrogen compound slurry can circulate between the first vessel and the second vessel by natural convection. In this configuration, since the necessity of the pump for circulating the hydrogen compound slurry between the first vessel and the second vessel is eliminated, the manufacturing cost of hydrogen can be improved compared to the configuration [3].

[5] A hydrogen production system according to still another aspect is the hydrogen production system of any one of [1] to [4], including a heat exchanger (15) for exchanging heat between the hydrogen compound slurry (4) flowing through the first passage (5) and the hydrogen compound slurry (4) flowing through the second passage (6).

With this configuration, the hydrogen compound slurry transferred from the first vessel to the second vessel is heated while the hydrogen compound slurry transferred from the second vessel to the first vessel is cooled, so the load on the first temperature adjustment device and the second temperature adjustment device can be reduced. As a result, the thermal efficiency can be improved, and the manufacturing cost of hydrogen can be improved.

[6] A hydrogen production system according to still another aspect is the hydrogen production system of any one of [1] to [5], including a water supply device (25) for supplying water to the first vessel (2).

With this configuration, water consumed by storing hydrogen in the first vessel can be replenished, allowing continuous production of hydrogen. [7] A hydrogen production system according to still another aspect is the hydrogen production system of any one of [1] to [6], including: a discharge device (51) for discharging the hydrogen compound slurry (4) in the second vessel (3); and a hydrogen compound supply device (41) for supplying the hydrogen compound member to the first vessel (2).

With this configuration, the deteriorated hydrogen compound member can be discharged, and on the other hand, a new hydrogen compound member can be supplied, allowing continuous production of hydrogen.

[8] A hydrogen production system according to still another aspect is the hydrogen production system of [7], in which the discharge device (51) includes a solid-liquid separator (54) for separating the hydrogen compound slurry (4) into solid and liquid phases.

With this configuration, if the hydrogen compound member is recyclable, the hydrogen compound member can be recovered by separating it from the discharged hydrogen compound slurry, and the recovered hydrogen compound member can be reused after regeneration.

[9] A hydrogen production system according to still another aspect is the hydrogen production system of [8], in which the hydrogen compound supply device (41) includes: a storage (slurry tank 42) for storing the hydrogen compound slurry (4); a slurry supply passage (43) connecting the storage (42) and the first vessel (2); and a supply pump (44), disposed on the slurry supply passage (43), for supplying the hydrogen compound slurry (4) in the storage (42) to the first vessel (2).

If the particulate hydrogen compound member is directly supplied into the first vessel, the supplied hydrogen compound member may agglomerate. In contrast, if the new hydrogen compound member is supplied in the form of slurry, it is possible to reduce the possibility that the hydrogen compound member agglomerates.

The invention claimed is:

1. A hydrogen production system, comprising:
a first vessel;
a second vessel having an internal temperature higher than that of the first vessel;
a first passage connecting the first vessel and the second vessel; and
a second passage connecting the first vessel and the second vessel and different from the first passage,
wherein at least one of the first vessel and the second vessel contain a hydrogen compound slurry in which a hydrogen compound member is suspended in a solvent containing water,
wherein when an element other than hydrogen is defined as X, the hydrogen compound member has a configuration in which a powder containing two-dimensional arrangement of a hydrogen compound represented by a chemical formula $X_mH_n$ is impregnated on a particulate support, a stoichiometric ratio min is 1:1 to 3:4, and the element X is boron,
wherein the hydrogen production system further comprising:
a water supply device for supplying water to the first vessel; and
a hydrogen compound supply device for supplying the hydrogen compound member to the first vessel,
wherein the hydrogen compound supply device includes:
a storage for storing the hydrogen compound slurry;
a slurry supply passage connecting the storage and the first vessel; and
a supply pump, disposed on the slurry supply passage, for supplying the hydrogen compound slurry in the storage to the first vessel, and
wherein the hydrogen production system is configured to allow the hydrogen compound slurry contained in the first vessel to move into the second vessel through the first passage, and the hydrogen compound slurry contained in the second vessel to move into the first vessel through the second passage.

2. The hydrogen production system according to claim 1, comprising:
a first temperature adjustment device for adjusting a temperature of the hydrogen compound slurry in the first vessel; and
a second temperature adjustment device for adjusting a temperature of the hydrogen compound slurry in the second vessel.

3. The hydrogen production system according to claim 1, comprising:
a first pump, disposed on the first passage, for transferring the hydrogen compound slurry in the first vessel to the second vessel; and
a second pump, disposed on the second passage, for transferring the hydrogen compound slurry in the second vessel to the first vessel.

4. The hydrogen production system according to claim 2, wherein the second passage is disposed vertically above the first passage,
wherein the first temperature adjustment device is disposed in the first vessel so as to be located above a position where the first passage is connected to the first vessel, and wherein the second temperature adjustment device is disposed in the second vessel so as to be located below a position where the first passage is connected to the second vessel.

5. The hydrogen production system according to claim 1, comprising a heat exchanger for exchanging heat between the hydrogen compound slurry flowing through the first passage and the hydrogen compound slurry flowing through the second passage.

6. The hydrogen production system according to claim 1, comprising:

a discharge device for discharging the hydrogen compound slurry in the second vessel.

7. The hydrogen production system according to claim 6, wherein the discharge device includes a solid-liquid separator for separating the hydrogen compound slurry into solid and liquid phases.

* * * * *